United States Patent [19]

Thau, Jr. et al.

[11] Patent Number: 4,702,500
[45] Date of Patent: * Oct. 27, 1987

[54] FIRE RESISTANT SEAL

[75] Inventors: Lawrence W. Thau, Jr., Somerset; Douglas R. Dole, Bridgewater Township, Somerset County, both of N.J.

[73] Assignee: Victaulic Company of America, Easton, Pa.

[*] Notice: The portion of the term of this patent subsequent to Feb. 17, 2004 has been disclaimed.

[21] Appl. No.: 903,663

[22] Filed: Sep. 4, 1986

Related U.S. Application Data

[63] Continuation-in-part of Ser. No. 812,136, Dec. 20, 1985, Pat. No. 4,643,461.

[51] Int. Cl.$^4$ .............................................. F16L 17/06
[52] U.S. Cl. .................................... 285/112; 285/373; 285/910; 285/187; 277/26
[58] Field of Search ............... 285/112, 111, 110, 187, 285/910, 373, 105, 104; 277/235, 26, 179, 228, 180, 205

[56] References Cited

U.S. PATENT DOCUMENTS 3,869,132 3/1975 Taylor et al. ......................... 277/26

FOREIGN PATENT DOCUMENTS

| 92964 | 6/1923 | Austria | 285/112 |
| 1473793 | 3/1967 | France | 285/112 |
| 33154 | 10/1970 | Japan | 285/112 |
| 16748 | 3/1909 | United Kingdom | 285/910 |
| 315550 | 7/1924 | United Kingdom | 285/112 |

*Primary Examiner*—Dave W. Arola
*Attorney, Agent, or Firm*—Abelman Frayne Rezac & Schwab

[57] ABSTRACT

An elastomeric seal for incorporation into a pipe coupling includes a fire-ring which acts to retain a residual portion of a radial flange of the seal in sealing relationship with the pipe ends in the event of thermal destruction of the remainder of the seal.

3 Claims, 1 Drawing Figure

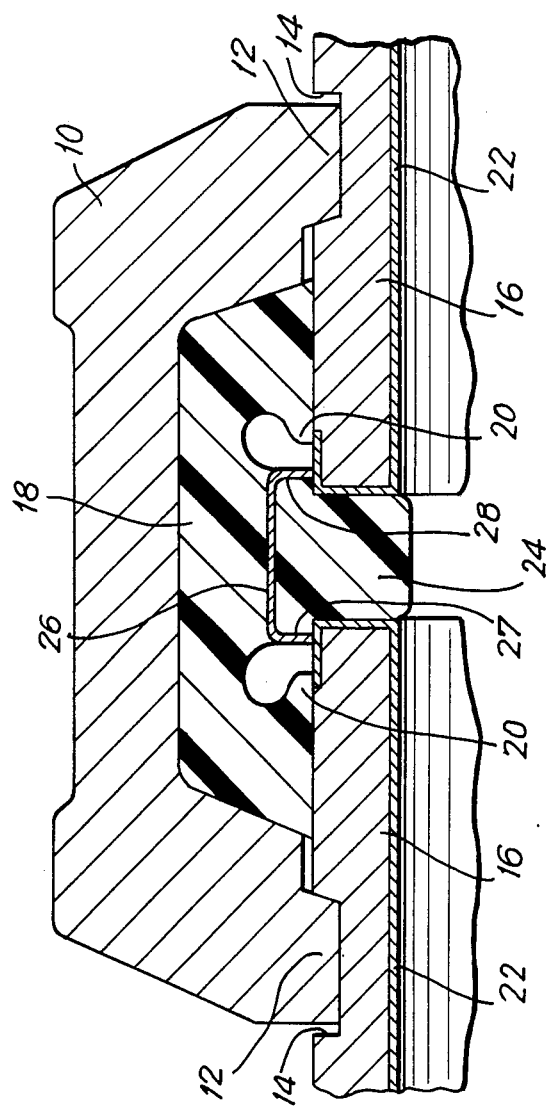

FIRE RESISTANT SEAL

RELATED APPLICATION

This application is a continuation-in-part of parent U.S. application Ser. No. 812136, Thau et al, filed Dec. 20, 1985, and allowed July 3, 1986 and now U.S. Pat. No. 4,643,461.

FIELD OF THE INVENTION

This invention relates to elastomeric seals of the type to be employed in conjunction with pipe couplings, and has particular application to such seals for segmented couplings to be employed in pipeline assemblies used in the conveying of flammable fluids such as oil, petroleum or gas, or, in conveying non-flammable fluids such as water, acids or caustic solutions.

BACKGROUND OF THE INVENTION

While pipe couplings having seals formed of an elastomeric material have been used with great success, the use therof is encumbered with one problem which can occur under particularly adverse conditions. This problems arises in the event that a fire occurs in the immediate vicinity of the coupling of sufficient intensity to cause heating of the elastomeric seal, and eventually, thermal destruction of the elastomeric seal contained within the coupling.

Under particularly adverse conditions, the seal can reach temperatures sufficient to cause volatilisation, vaporisation and carburization of the elastomeric material to the point of total destruction of the seal, and, the conversion of the elastomeric material into a porous and friable coke-like material.

If such a circumstance occurs, then, sealing of the coupling is negated or impaired, with the consequence that fuel comprised by the fluid content of the pipeline assembly is added to the existing external fire, with probable aggravation of the fire condition. In the event that the pipeline assembly is employed for conveying water used for fire extinguishing apparatus, then, the water pressure is lost or severely reduced, thus impairing the efficiency of the fire fighting equipment associated with the pipeline. If the pipeline assembly is employed for conveying noxious substances such as acids or caustic solutions, then, extensive clean-up is required subsequent to the correction of the condition.

BACKGROUND OF THE INVENTION

While the problem discussed above has long been known as a pressing one in the art, little if any attention has been given to the problem, the usual approach being either to ignore the problem due to the remoteness of possibility of its occurrence, or, to avoid the use of couplings containing elastomeric seals, and instead, to employ complex and expensive couplings that are not as readily subject to thermal destruction.

SUMMARY OF THE INVENTION

It is an object of this invention to provide a heat resistant seal for use in a pipe coupling, which has the capability of maintaining satisfactory sealing for an extended period of time, even in the event that the coupling is directly exposed to open flame of an intensity sufficient to cause heating of the coupling to a temperature sufficient to cause thermal destruction of the contained elastomeric gasket.

According to the present invention, the elastomeric seal has a fire-ring associated therewith, the fire-ring being formed from a material that is highly resistant to thermal destruction.

The fire-ring is positioned in bridging relationship with the adjacent ends of pipes of the pipeline assembly, such that, in the event of decomposition of the seal, the fire-ring maintains substantially complete sealing of the pipes.

The fire-ring itself is formed from any suitable metal, such as stainless steel, and is formed for it to present axially spaced, radially inwardly extending legs adapted to be positioned over the adjacent ends of the pipes to be sealed in close fitting relationship therewith.

The fire-ring is embedded within a radial annular flange of the seal, which extends radially inwardly of the inner periphery of the seal, such that a portion of the annular flange is maintained in registry with the pipe ends within a cage provided by the fire-ring, and is located directly within and directly cooled by the fluid contents of the pipeline assembly and is in that manner protected against thermal destruction.

DESCRIPTION OF THE DRAWINGS

The invention will now be described with reference to the accompanying drawing, which illustrates a preferred embodiment of the invention, and in which:

The single drawing is a cross-section through a preferred embodiment of heat resistant seal of the present invention.

DESCRIPTION OF THE PREFERRED EMBODIMENT

Referring now to the drawing, a transverse cross-section through a pipe coupling segment of a conventional segmented coupling is indicated at 10, the coupling having keys 12 on its respective innermost peripheries for engagement within grooves 14 in the respective juxtaposed ends of pipes 16 of a pipeline assembly.

Contained internally of the coupling segment 10 is a sealing gasket 18 of generally conventional form, and which includes sealing lips 20 for engagement with the exterior surface of the respective pipe ends.

Optionally, the respective pipes may be of the type provided with a lining of plastics material 22, such as are commonly employed in the oil industry.

The elastomeric seal may be comprised of any material specific to the application in which it is to be employed, and typically, will be formed from a relatively hard rubber-like material such as nitrile rubber, E.P.D.M., Viton (registered trademark of the DuPont Company) or the like.

In order to further delay leakage from the joint in the event that it is exposed to a conflagration, the seal, or the radial flange of the seal, or specific portions thereof, can be molded from a material that becomes intumescent at high temperatures for it to expand and further pressurize the seal.

Extending radially inwardly of the inner periphery of the elastomeric seal 18 is an annular flange 24 molded integrally with the body of the seal, and which is molded in situ about a metallic fire-ring 26, the fire-ring 26 being formed radially outwardly convex and formed for it to present radially inwardly extending legs 27 and 28 which are spaced axially by a distance sufficient for the fire-ring to span the adjacent ends of the pipes 16 to be sealed. In this manner, the fire-ring acts as a continuous cage for the radially innermost portion of the flange to protect it and retain it in correct sealing position between the pipe ends in the event of the thermal destruction of the remainder of the seal.

The coupling segments preferably, but not essentially, are of the type, such as is commonly known, that will act to move the juxtaposed ends of the respective pipes towards each other as the coupling segments are tightened down, in order to exert a compressive force on the radial annular flange. Such axial compression is not, however, essential.

If the assembly is exposed to an external conflagration, then, heat will be transmitted through the coupling segments 10, which typically are formed of cast ductile iron, and, the elastomeric seal contained within the couplings segments 10 will be exposed to a progressively escalating temperature. If the temperature increases sufficiently, eventually it will cause softening and plasticising of the elastomeric material comprising the seal, and, further increase of the temperature of the elastomeric material to above its destruction temperature eventually will cause volatilization or vaporization of the volatile components of the seal, and, eventually conversion of the elastomeric material to a porous and friable coke-like material and, destroy the sealing capability of the seal in its entirety.

It is at this point that the utility of the fire-ring 26 becomes evident, and, its ability to prevent or limit the fluid contents of the pipeline, which usually are under pressure, from escaping between the juxtaposed ends of the pipes and into the cavity in the coupling segments provided for reception of the elastomeric seal 18. In the absence of the fire-ring, the fluid contents of the pipeline would then have directed access to the exterior of the coupling, primarily through the spaces which exist between the bolting pads of the coupling segments, and secondarily, by seepage under and around the respective keys 12.

In the event of burn-out of the elastomeric seal, which can progress up to the fire-ring 26, then, the fire-ring 26 will act as a cage to retain the remaining portion of the radial annular flange in its position extending in sealing relationship between the pipe ends, in which position the said remaining portion of the radial annular flange is exposed to and cooled by the fluid contents of the pipeline assembly.

Thus, even in the event of a complete burn-out of the elastomeric seal, a residual ring-shaped portion of the elastomeric seal is retained in efficient sealing relationship with the respective pipe ends, this acting against leakage past the fire-ring, and at least temporarily maintaining an efficient seal at the pipe ends. It has been found that even in the event of total burn-out of the main body of the elastomeric seal 18, the residual portion of the annular radial flange will maintain its sealing capabilities for periods well in excess of 20 minutes, during which time it is to be assumed that the external conflagration will have been brought under control.

We claim:

1. A fail-safe fire retardant seal assembly for use in a segmented pipe-coupling of the type including plural coupling segments adapted to be secured in encircling relationship about the juxtaposed ends of pipes, and which provide an internal annular channel for the reception of said seal assembly, said seal assembly including:

an annular seal member formed from a thermally destructible elastomeric material, said seal member comprising an annular body having axially aligned sealing surfaces on an inner periphery thereof which seal against the outer circumferential surfaces of the ends of the pipes, with said sealing surfaces defining a circumferentially extending slot in the inner periphery of said annular body;

a radial flange of said seal member extending radially inwardly of said annular body and located between said sealing surfaces; and an annular ring of fire resistant material incorporated into said radial flange, said annular ring having axially spaced and radially inwardly extending legs for engagement with the outer circumferential surfaces of the respective pipes to be sealed, and defining a continuous cage in which the radially innermost portion of said radial flange is confined and protected against thermal destruction in the event of thermal destruction of the remainder of said seal member, said radially innermost portion of said flange being for engagement by the radial end faces of said pipes in sealing relationship therewith.

2. The seal assembly of claim 1, in which said annular ring is formed from metal.

3. The seal assembly of claim 2, in which said annular ring is formed from stainless steel.

* * * * *